(12) United States Patent
Le Tallec et al.

(10) Patent No.: US 6,484,496 B2
(45) Date of Patent: Nov. 26, 2002

(54) SYSTEM FOR ASSISTING THE REGENERATION OF A PARTICLE FILTER INTEGRATED INTO AN EXHAUST LINE OF A MOTOR VEHICLE DIESEL ENGINE

(75) Inventors: Patrice Le Tallec, Sartrouville (FR); Olivier Salvat, Paris (FR)

(73) Assignee: Peugeot Citroen Automobiles S.A., Neuilly sur Seine (FR)

(*) Notice: Subject to any disclaimer, the term of this patent is extended or adjusted under 35 U.S.C. 154(b) by 0 days.

(21) Appl. No.: 09/765,420

(22) Filed: Jan. 22, 2001

(65) Prior Publication Data

US 2001/0010152 A1 Aug. 2, 2001

(30) Foreign Application Priority Data

Jan. 20, 2000 (FR) .......................................... 00 00703

(51) Int. Cl.⁷ .................................................. F01N 3/00
(52) U.S. Cl. ........................... 60/295; 60/274; 60/278; 60/280; 60/286; 60/311
(58) Field of Search ............................ 60/278, 297, 311, 60/295, 286, 280

(56) References Cited

U.S. PATENT DOCUMENTS

| | | | |
|---|---|---|---|
| 4,452,040 A | * 6/1984 | Kobashi ....................... 60/311 |
| 4,617,793 A | * 10/1986 | Suzuki et al. ................. 60/311 |
| 4,671,059 A | * 6/1987 | Lawson ........................ 60/311 |
| 4,685,290 A | 8/1987 | Kamiya et al. |
| 4,685,291 A | * 8/1987 | Ha ............................... 60/286 |
| 4,813,233 A | * 3/1989 | Vergeer et al. ................ 60/286 |
| 5,319,930 A | * 6/1994 | Shinzawa et al. ............. 60/286 |
| 5,440,880 A | * 8/1995 | Ceynow et al. ............ 60/605.2 |
| 5,758,496 A | * 6/1998 | Rao et al. ..................... 60/297 |
| 5,771,868 A | * 6/1998 | Khair ........................ 60/605.2 |
| 5,813,223 A | * 9/1998 | Barthe et al. ................. 60/295 |
| 5,826,425 A | * 10/1998 | Rossi Sebastiano et al. .. 60/286 |
| 5,974,791 A | * 11/1999 | Hirota et al. ................. 60/286 |
| 6,067,973 A | * 5/2000 | Chanda et al. ............... 123/585 |
| 6,318,074 B1 | * 11/2001 | Nishimura et al. ........... 60/284 |
| 6,345,500 B2 | * 2/2002 | Itou et al. ..................... 60/284 |

FOREIGN PATENT DOCUMENTS

| | | |
|---|---|---|
| DE | 19746855 | 10/1997 |
| EP | 0411445 A2 | 2/1991 |
| EP | 0411445 A3 | 2/1991 |
| JP | 07259533 | 10/1995 |
| JP | 07-279645 | * 10/1995 |
| JP | 08-042326 | * 2/1996 |

OTHER PUBLICATIONS

"A Review of the Effect of Particulate Traps on the Efficiency of Vehicle Diesel Engines" A.M. Stamatelos, Energy Convers. Mgmt vol. 38,No. 1, pp. 38–99, 1997.

"La plus grande invention depuis le moteur diesel" Revue Automobile No. 19/6 Mai 1999, p. 21.

* cited by examiner

*Primary Examiner*—Thomas Denion
*Assistant Examiner*—Diem Tran
(74) *Attorney, Agent, or Firm*—Connolly Bove Lodge & Hutz LLP

(57) ABSTRACT

This system is characterized in that the engine is linked to various members and to means for checking the operation of these various members in order to control the operation of the engine, these means also being designed to trigger a regeneration phase of the particle filter by combustion of the particles trapped in the latter, at the same time initiating a phase of multiple injections of fuel into the cylinders of the engine during their expansion phase, and in that the checking means comprise means for determining the particle load of the filter, which are connected a differential-pressure sensor arranged at the terminals of the filter and designed to deliver information representing the overall load of the filter, means for estimating the load of the filter in terms of residues other than the particles, and means for calculating the load of the particle filter from the overall load and from the load of other residues of the filter.

2 Claims, 1 Drawing Sheet

SYSTEM FOR ASSISTING THE REGENERATION OF A PARTICLE FILTER INTEGRATED INTO AN EXHAUST LINE OF A MOTOR VEHICLE DIESEL ENGINE

The present invention relates to a system for assisting the regeneration of a particle filter integrated into an exhaust line of a motor vehicle diesel engine.

BACKGROUND OF THE INVENTION

It is known that design engineers are constantly preoccupied with reducing the pollutant emissions associated with the running of motor vehicle engines and, in particular, of diesel engines.

Various systems have already been developed in the prior art in order to reduce the level of these pollutant emissions, particularly using a particle filter integrated into the exhaust line.

However, managing the functioning of the latter and, in particular, managing its regeneration also present difficulties.

The object of the invention is, therefore, to solve these.

BRIEF DESCRIPTION OF THE INVENTION

For this purpose, the subject of the invention is a system for assisting the regeneration of a particle filter integrated into an exhaust line of a motor vehicle diesel engine, characterized in that the engine is linked to various members including:

means for the admission of air into the engine, means for recycling the exhaust gas from the engine at the inlet of the latter, a turbocompressor, an oxidizing catalyst arranged upstream of the particle filter in the exhaust line;

a system for the common supply of fuel to the cylinders of the engine, comprising electrically controlled injectors associated with these cylinders, means for adding to the fuel an additive intended to be deposited onto the particle filter in order to lower the combustion temperature of the particles trapped in the latter, means for the acquisition of information relating to various operating parameters of the engine and of the members linked to the latter, and means for checking the operation of the admission means, of the recycling means, of the turbocompressor and/or of the supply system in order to control the operation of the engine, these means also being designed to trigger a regeneration phase of the particle filter by combustion of the particles trapped in the latter, at the same time initiating a phase of multiple injections of fuel into the cylinders of the engine during their expansion phase, and in that the checking means comprise means for determining the particle load of the filter, which are connected to a differential-pressure sensor arranged at the terminals of the particle filter and designed to deliver information representing the overall load of the filter, means for estimating the load of the filter in terms of residues other than these particles, and means for calculating the load of the particle filter from the overall load and from the load of other residues.

BRIEF DESCRIPTION OF THE DRAWINGS

The invention will be understood more clearly from a reading of the following description given purely by way of example and made with reference to the accompanying drawing which shows a block diagram illustrating a motor vehicle diesel engine and the various members linked to the latter.

DETAILED DESCRIPTION OF THE INVENTION

Figure 1:
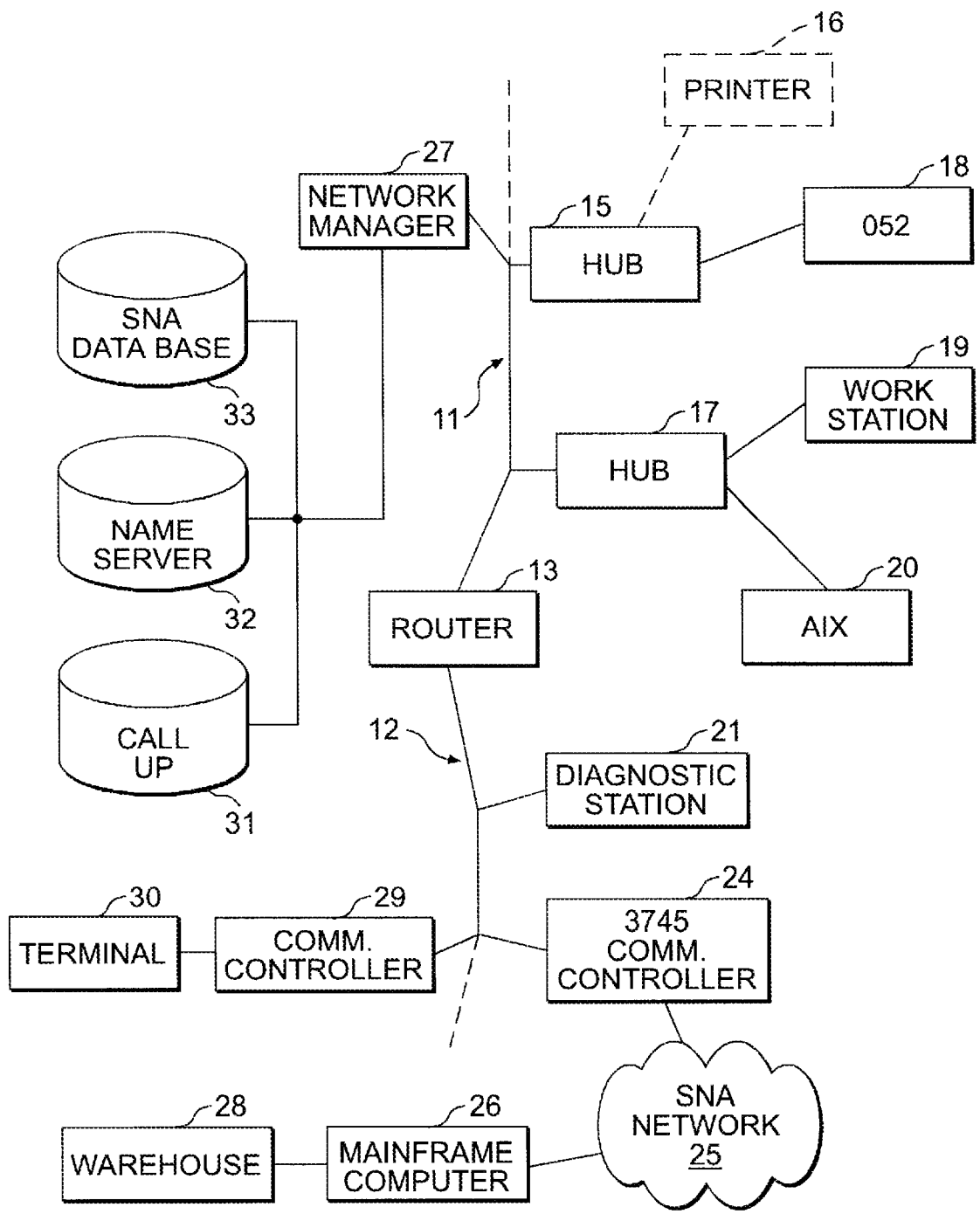

To be precise this figure shows a motor vehicle diesel engine which is designated by the general reference 1.

This diesel engine is linked to means for the admission of air at the inlet of the latter, which are designated by the general reference 2.

At the outlet, this engine is linked to an exhaust line which is designated by the general reference 3.

Means for recycling the exhaust gas from the engine at the inlet of the latter are also provided and are designated by the general reference 4.

These means are then interposed, for example, between the outlet of the engine and the means 2 for the admission of air into the latter.

The exhaust line may also be linked to a turbocompressor, designated by the general reference 5, and, more particularly, to the turbo portion of the latter, in the conventional way.

Finally, the exhaust line comprises an oxidizing catalyst, designated by the general reference 6, which is arranged upstream of a particle filter, designated by the general reference 7, arranged in the exhaust line.

The engine is likewise linked to a system for the common supply of fuel to the cylinders of the latter. This system is designated by the general reference 8 in this Figure and comprises, for example, electrically controlled injectors associated with the cylinders.

In the exemplary embodiment shown, the engine is a four-cylinder engine and therefore comprises four electrically controlled injectors 9, 10, 11 and 12 respectively.

These various injectors are associated with a common fuel-supply rail designated by the general reference 13 and connected to fuel-supply means designated by the general reference 14 and comprising, for example, a high-pressure pump.

These supply means are connected to a fuel tank, designated by the general reference 15, and to means for adding to this fuel an additive intended to be deposited onto the particle filter in order to lower the combustion temperature of the particles trapped in the latter.

In fact, this additive may, for example, be contained in an auxiliary tank designated by the general reference 16 and associated with the fuel tank 15, so as to make it possible to inject a particular quantity of this additive into the fuel.

Finally, this engine and the various members which have just been described are likewise linked to means for checking their operation, designated by the general reference 17 in this Figure, comprising, for example, any suitable computer 18 associated with information storage means 19 and connected at the input to various means for the acquisition of information relating to various operating parameters of this engine and of these members, this computer then being designed to check the operation of the admission means, of the recycling means, of the turbocompressor and/or of the supply system in order to check the operation of the engine and, in particular, the torque generated by the latter as a function of the running conditions of the vehicle, in a conventional way.

Thus, for example, this computer is connected to a differential-pressure sensor 20, to the terminals of the catalyst and of the particle filter 6 and 7 respectively, and to temperature sensors 21, 22 and 23 respectively, upstream of the catalyst between this catalyst and the particle filter and downstream of this particle filter in the exhaust line.

The computer can also receive information on the oxygen content of the exhaust gases from a lambda λ probe designated by the general reference 24 in this figure and integrated into the exhaust line.

At its output, this computer is designed to control the air admission means, the exhaust gas recycling means, the turbocompressor, the means for adding the additive to the fuel, the means for supplying fuel to the common rail and the various injectors associated with the cylinders of the engine.

In particular, this computer is designed to trigger a regeneration phase of the particle filter by combustion of the particles trapped in the latter, at the same time initiating a phase of multiple injections of fuel into the cylinders of the engine during their expansion phase.

To be precise, the particles emitted by the engine while it is in operation are trapped in the particle filter. It is therefore appropriate to regenerate the latter regularly by combustion of these particles.

The checking means 17 comprise means for determining the particle load of the filter 7.

These determining means are formed by the computer 18 connected to the differential-pressure sensor 20 arranged at the terminals of the particle filter 7. To be precise, the said sensor delivers information representing the overall load of the filter, the differential pressure at the terminals of the filter being a function of its load.

The checking means 17 also comprise means for estimating the load of the filter in terms of residues other than the particles, which comprise, for example, means for the accumulative totaling of the deposits of residues on the filter. These means are likewise formed by the computer 18.

These other residues may comprise, for example, ash, oil, additive added to the fuel, etc. This load of other residues can be estimated and cumulatively totaled by the computer 18 while the vehicle engine is in operation, in order to obtain an estimate of the load, continuously or periodically.

On the basis of this information on the overall load of the particle filter 7 delivered by the differential-pressure sensor 20 and on the load of residues other than the particles which is estimated by the computer 18, the checking means 17 and, more particularly, the computer 18 are thus designed to calculate the particle load of the filter at a given moment, thus making it possible to optimize the triggering of the regeneration of this filter so as to subtract the load of residues from the overall load.

What is claimed is:

1. A regeneration system comprising:
    a particle filter integrated into an exhaust line of a motor vehicle diesel engine;
    means for admitting air into the engine;
    means for recycling exhaust gas from the engine into an inlet of the engine; a turbocompressor;
    an oxidizing catalyst arranged upstream of the particle filter and in the exhaust line;
    means for commonly supplying fuel to the cylinders of the engine and including electrically controlled injectors associated with respective engine cylinders;
    means for adding, to the fuel, an additive to be deposited onto the particle filter in order to lower the combustion temperature of the particles trapped in the filter; means for acquiring information relating to various operating parameters of the engine and of preselected members linked to the engine; and
    means for monitoring the operation of the air admitting means, of the recycling means, of the turbocompressor, and the supply system in order to control the operation of the engine, the monitoring means triggering a regeneration phase of the particle filter by combustion of the particles trapped in the filter, at the same time initiating a phase of multiple injections of fuel into the cylinders of the engine during their expansion phase;
    the monitoring means further including
        a) means for determining the particle load of the filter, the determining means connected to a differential pressure sensor arranged at terminals of the particle filter and outputting information representing the overall load of the filter;
        b) means for estimating the residue load of the filter for material other than particles trapped in the filter; and
        c) means for calculating the total load of the particle filter, including the overall particle and residue loads.

2. An engine particle filter regeneration method comprising the steps:
    integrating a particle filter into an exhaust line of a motor vehicle diesel engine;
    admitting air into the engine;
    recycling exhaust gas from the engine into an inlet of the engine;
    subjecting exhaust gas to turbocompression;
    locating an oxidizing catalyst upstream of the particle filter and in the exhaust line;
    commonly supplying fuel to the cylinders of the engine and including electrically controlled injectors associated with respective engine cylinders;
    adding, to the fuel, an additive to be deposited onto the particle filter in order to lower the combustion temperature of the particles trapped in the filter;
    acquiring information relating to various operating parameters of the engine and of preselected members linked to the engine; and
    monitoring the operation of the air admission, of the exhaust, of the turbocompression, and of the commonly supplying fuel to control the operation of the engine, the monitoring triggering a regeneration phase of the particle filter by combustion of the particles trapped in the filter, at the same time initiating a phase of multiple injections of fuel into the cylinders of the engine during their expansion phase;
    the monitoring further including
        a) determining the particle load of the filter and outputting information representing the overall particle load of the filter;
        b) estimating the residue load of the filter for material other than particles trapped in the filter; and
        c) calculating the total filter load including the overall particle load and the residue load.

* * * * *